United States Patent
Pandey et al.

(10) Patent No.: US 8,364,786 B2
(45) Date of Patent: Jan. 29, 2013

(54) SYNTHESIZING A SCALABLE AND INCREMENTALLY UPDATABLE SYSTEM SOFTWARE INFRASTRUCTURE FOR SENSOR NETWORKS

(75) Inventors: Raju Pandey, Davis, CA (US); Joel J. Koshy, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 837 days.

(21) Appl. No.: 11/336,725

(22) Filed: Jan. 19, 2006

(65) Prior Publication Data
US 2006/0161909 A1  Jul. 20, 2006

Related U.S. Application Data

(60) Provisional application No. 60/646,185, filed on Jan. 20, 2005.

(51) Int. Cl.
- *G06F 15/177* (2006.01)
- *G06F 15/16* (2006.01)
- *G06F 13/00* (2006.01)
- *G06F 9/44* (2006.01)
- *G06F 9/445* (2006.01)

(52) U.S. Cl. ........ 709/220; 709/205; 710/303; 717/101; 717/174

(58) Field of Classification Search .......... 709/220–222, 709/238
See application file for complete search history.

(56) References Cited

U.S. PATENT DOCUMENTS

| | | | |
|---|---|---|---|
| 5,084,813 A * | 1/1992 | Ono | 717/107 |
| 6,327,617 B1 * | 12/2001 | Fawcett | 709/219 |
| 2004/0143830 A1 * | 7/2004 | Gupton et al. | 717/174 |
| 2004/0199897 A1 * | 10/2004 | Ghercioiu et al. | 717/101 |
| 2005/0028001 A1 * | 2/2005 | Huang et al. | 713/200 |
| 2005/0251652 A1 * | 11/2005 | Nallusamy | 712/209 |
| 2005/0289536 A1 * | 12/2005 | Nayak et al. | 717/174 |
| 2006/0098594 A1 * | 5/2006 | Ganesh | 370/328 |
| 2007/0115827 A1 * | 5/2007 | Boehnke et al. | 370/236 |

FOREIGN PATENT DOCUMENTS

JP  08278911 A  * 10/1996

OTHER PUBLICATIONS

Oi-H, Bleakley-C-J.;Towards a low power virtual machine for wireless sensor network motes.;20060000.;IEEE Computer Society, Los Alamitos, CA, USA.;2007007.;p. 5 pp., 15 refs, pp.*

* cited by examiner

*Primary Examiner* — Ashok B. Patel
*Assistant Examiner* — Evans Desrosiers
(74) *Attorney, Agent, or Firm* — Park, Vaughan, Fleming & Dowler LLP; Laxman Sahasrabuddhe

(57) ABSTRACT

One embodiment of the present invention provides a method and a system for synthesizing a scalable and incrementally updatable system software infrastructure for sensor networks. During operation, the system receives a specification for an application and a specification for target devices. The system analyzes these specifications in order to identify a set of software components required to support the application, and then proceeds to synthesize a customizable software stack that accommodates the identified set of software components on a specified target device. This process generates a minimal, resource-efficient software stack for a specific application on the specified target device.

12 Claims, 4 Drawing Sheets

SYNTHESIZING A SCALABLE AND INCREMENTALLY UPDATABLE SYSTEM SOFTWARE INFRASTRUCTURE FOR SENSOR NETWORKS

RELATED APPLICATION

This application claims priority under 35 U.S.C. §119(e) to U.S. Provisional Application Ser. No. 60/646,185, filed on 20 Jan. 2005, the contents of which are herein incorporated by reference.

BACKGROUND

1. Field of the Invention

The present invention relates generally to the problem of creating and distributing software for sensor networks. More specifically, the present invention relates to a method and an apparatus for synthesizing a scalable and incrementally updatable system software infrastructure for sensor networks.

2. Related Art

Wireless sensor networks are finding applications in a wide range of areas, including disaster recovery, homeland security, infrastructure monitoring, habitat monitoring, and pervasive computing environments. A wireless sensor network is typically comprised of a collection of devices embedded in a physical environment which gather information, perform local computations, and communicate with other devices and hosts through a wireless network.

Wireless sensor networks pose unique challenges for software developers compared to other forms of software construction because the devices that comprise wireless sensor networks have limited amounts of memory, processing capability, and battery power. As a result, wireless sensor network research has created designs for a wide variety of highly-efficient hardware platforms specialized to perform specific tasks. The wide variety of such platforms creates a considerable burden for the programmer, who needs to be aware of the idiosyncrasies of each specific platform.

Over time, as the installed base of sensor networks grows, the need to support applications across heterogeneous devices and platforms will continue to grow. The capabilities of the system software used during development of applications for wireless sensor networks can greatly affect the complexity of implementing wireless sensor networks. However, existing techniques for developing such applications have so far only focused on developing applications for a single platform.

Hence, what is needed is a method and an apparatus that facilitates creating applications for sensor networks without the limitations of the above-described techniques.

SUMMARY

One embodiment of the present invention provides a method and a system for synthesizing a scalable and incrementally updatable system software infrastructure for sensor networks. During operation, the system receives a specification for an application and a specification for target devices. The system analyzes these specifications in order to identify a set of software components required to support the application, and then proceeds to synthesize a customizable software stack that accommodates the identified set of software components on a specified target device. This process generates a minimal, resource-efficient software stack for a specific application on the specified target device.

In a variation on this embodiment, the system automatically synthesizes and scales software environments for a given application across a variety of heterogeneous devices with varying resources and capabilities. As part of the scaling process, the system identifies software components with enhanced or diminished capabilities that fit the capabilities of the specific device type.

In a variation on this embodiment, the system synthesizes the customizable software stack for the specified target device using a sensor network topology and a device description.

In a further variation, the system uses the device description to define constraints for software components. In doing so, the system uses these constraints to identify potential software components for the customized software stack of a specific device type.

In a variation on this embodiment, while analyzing the specification, the system identifies the software components that it will use to automatically generate a virtual machine, an operating system, and/or middleware for the specified target device.

In a further variation, the system updates the specific application over time. As part of this process, the system tracks application updates and the set of software components used by the specific application, and then generates incremental updates for the customizable software stack on the specified target devices based on changes to the application.

In a further variation, the system changes and/or installs new software components for the specified target device while generating incremental updates.

In a further variation, while identifying software components the system also creates a set of compacted opcodes for the virtual machine. This set of compacted opcodes only includes opcodes specifically used in the application, thereby facilitating a more compact opcode representation.

DETAILED DESCRIPTION

Figure 1:
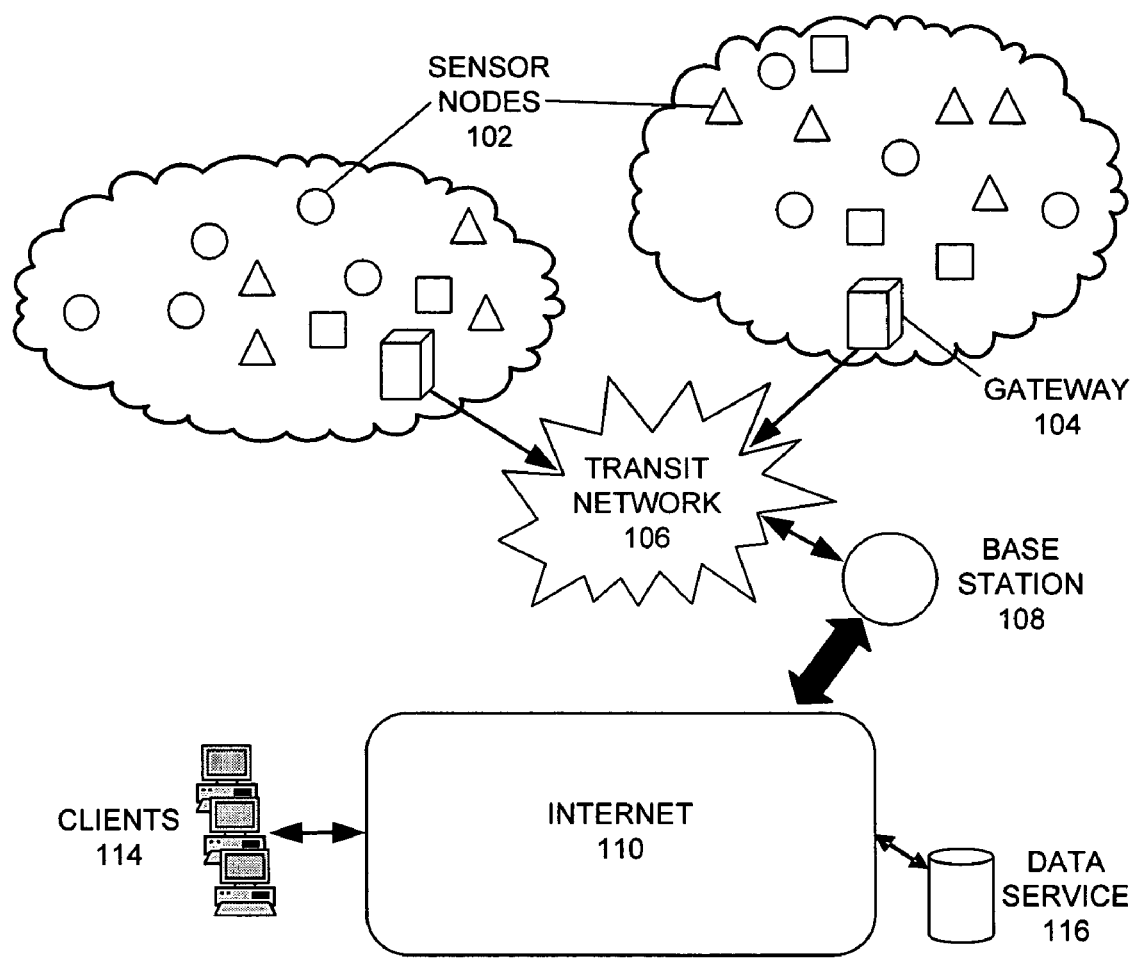
FIG. 1 illustrates a wireless sensor network application in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded, the widest scope consistent with the claims.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs), DVDs (digital versatile discs or digital video discs), or any device capable of storing data usable by a computer system.

Wireless Sensor Networks

Wireless sensor networks (WSNs) are emerging as an important technology that allows tight integration of the physical world with a computing system infrastructure. Ad hoc, self-organizing, distributed wireless sensor systems composed of a vast number of sensor nodes can be deeply embedded in physical environments. While nodes can vary in their basic architecture, most have severe resource limitations that call for extremely efficient computation models and communication patterns. The design and maintenance of software infrastructure needs to be attentive to these constraints, while addressing the complexities inherent to any distributed system.

WSNs are diverse at all levels, from their hardware configurations to the applications they run. Multiple modes of sensing, computing, and communication enable a wide spectrum of applications that include, but are not limited to, disaster recovery, homeland security, civilian infrastructure monitoring, condition-based maintenance in factories, education, habitat monitoring, precision agriculture, military use, education, and pervasive computing environments. Applications in these areas can be characterized not only by their diversity, but also by the specific and unique requirements they impose on underlying software and network infrastructure. Often, they require long-term uninterrupted and unattended operations. Key characteristics include:

small nodes with cost limitations and highly limited resources (e.g. small amounts of memory and low-power/low-bandwidth communication mechanisms),
heterogeneity in nodes,
applications and systems software that evolve during application lifetime, and
physical node deployment.

In order to enable the successful development, deployment, and management of sensor network applications, the applied software technology should ideally not limit long-term reliability and secure deployment, and should ideally ensure that each of the above characteristics are addressed suitably.

FIG. 1 illustrates an exemplary wireless sensor network application, in which a set of heterogeneous sensor nodes 102 observe and gather information from two physical environments. Gateways 104 in each environment collect and aggregate these results and then send them through a transit network 106 to a base station 108. The base station 108 in turn processes the data and then forwards the results through the Internet 110 to a set of interested clients 114. The base station can also send the data to a data service 116 for long-term storage or backup. Note that even a single WSN deployment may require a wide range of devices and architectures. For instance, for the WSN of FIG. 1, there are three types of nodes (sensor nodes, gateways, and base stations), whose roles are filled by specialized devices with different capabilities.

Figure 2A:
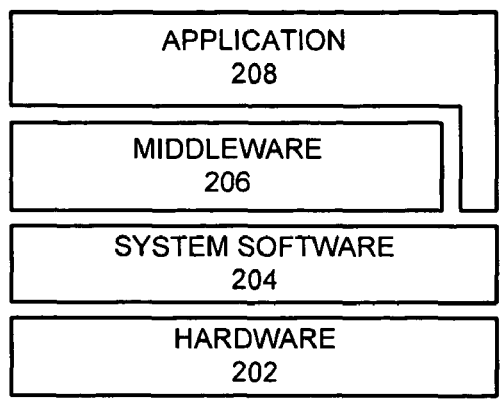
FIG. 2A illustrates a traditional software stack in accordance with an embodiment of the present invention.

WSN applications are typically built using software infrastructure. (e.g. operating systems, middleware, virtual machines, etc.) that interface the applications with the low-level devices, provide communication mechanisms for cooperation among devices, and manage device and network-wide resources. FIG. 2A illustrates a traditional software stack. A layer of system software 204 is implemented directly upon the device hardware 202, and a set of middleware services 206 are built on top of the system software 204. Applications 208 can interact with the middleware 206 or directly with the system software 204.

WSN software infrastructure needs to run on a wide variety of devices, have a minimal resource footprint, and be easily adapted to run on a new set of devices. One option is to build for the lowest common denominator, but this fails to take advantage of the unique features of each platform. Maintaining a separate version of an application for each platform takes advantage of unique platform features, but requires developers to understand the peculiarities of each platform. In addition, in such an environment it is difficult for developers who need to be able to work with software that they did not write and account for performance and resource usage implications.

The present invention provides a set of component-based development techniques that automate the process of customizing applications and system software for a range of widely different platforms, thereby making WSN applications easier to write, deploy, and maintain. This approach breaks software artifacts into fine-grained components and composes these components according to a set of non-functional constraints, application requirements, and device properties.

Software Synthesis and Scaling

The key challenge in building a software stack for heterogeneous and resource-constrained devices lies in developing techniques that: (1) expose a common set of abstractions that are independent of specific platforms; and (2) permit mapping of these abstractions to a wide range of platforms with diverse resources and capabilities. An important insight takes advantage of two possible views of a software stack: a logical view and a reified view. An application developer sees the logical and platform-independent view when developing software components, so that the development task is unhindered by peculiarities and limitations of target sensor devices. The reified view is an application-specific projection of the logical view for a specific device. The logical view thus denotes a product family, whereas the generated reified view denotes a specific product in the family. The development challenge lies in designing software techniques and tools that facilitate and automate the process of constructing reified views from logical views.

Two principal aspects of reification are software synthesis and software scaling. Software synthesis of a WSN application involves identifying semantic properties of an application and discovering the software components needed to build a complete execution environment for the application. Synthesis involves analyzing the semantic properties of an application, identifying the programming language abstractions used and components required, and then configuring an execution environment that contains these abstractions and components. Software synthesis is useful because the logical abstract view may be too general, which results in an unnecessarily rich service model with a very narrow application layer. On resource-constrained devices, loading an entire suite of services may be impossible. Synthesis allows the system to discard abstractions not needed by a specific application, thereby resulting in a minimal, resource-efficient infrastructure.

While software synthesis yields a compact semantic view, the system may not be able to implement this view in a general form on many platforms due to resource constraints or fundamental architectural limitations. In these cases, the system may need to use "software scaling" to scale the synthesized software stack up or down so that services implemented by the components can be provided at enhanced or diminished capacity. The system expands this notion of scaling, traditionally used to characterize the ability to adapt in demand or resources at run time, by allowing the developer to adjust software to known differences in the runtime environment at build time. The result is a scalable software design methodology aimed at building software artifacts that can run on a wide variety of devices with different levels of quality and fidelity depending on the resources and capabilities of the underlying platforms.

One example of software scaling is a garbage collection component. Some garbage collectors have significant memory overhead, while others require much less space but may be slow. A system that uses scaling can automatically select a garbage collection component that meets the resource limitations of a specific platform.

Software scaling highlights the design trade-offs that can be made with respect to resources that are available, and codifies these trade-offs so that the software stack for WSN applications can be automatically generated. Software scaling requires identifying design trade-offs for three aspects of software artifacts: state, computations, and information representation. States capture the specific knowledge used in a computation, and can be stored at different levels of detail or extent. For instance, in FIG. 1, the gateway nodes 104 may have more memory, and thus store additional network routing information, while the sensor nodes 102 store only application-specific and nearest-neighbor data. Computations transform knowledge in the network. The choice of computation techniques will depend on the speed of the CPU or other hardware capabilities (e.g. the lack of a dedicated floating-point unit may result in software estimation of floating point values). Finally, the system can represent information about program abstraction at different levels of detail. An example in this instance is the amount of type information available for runtime reflection, serialization, and debugging purposes; typed object or byte code may consume a significant amount of space, and sometimes cannot be stored on smaller nodes. Software scaling enables the system to identify and represent the design trade-offs in states, computations, and information representation, and thereby automate the synthesis of highly-scalable software systems.

In one embodiment of the present invention, the system achieves scaling by providing language mechanisms and tools. These mechanisms identify the design parameters (e.g. memory, energy efficiency, performance, etc.), associate the design parameters with application and software infrastructure components, and use a design trade-off technique to select the set of components that will satisfy implicit application requirements and meet overall resource constraints.

Figure 2B:
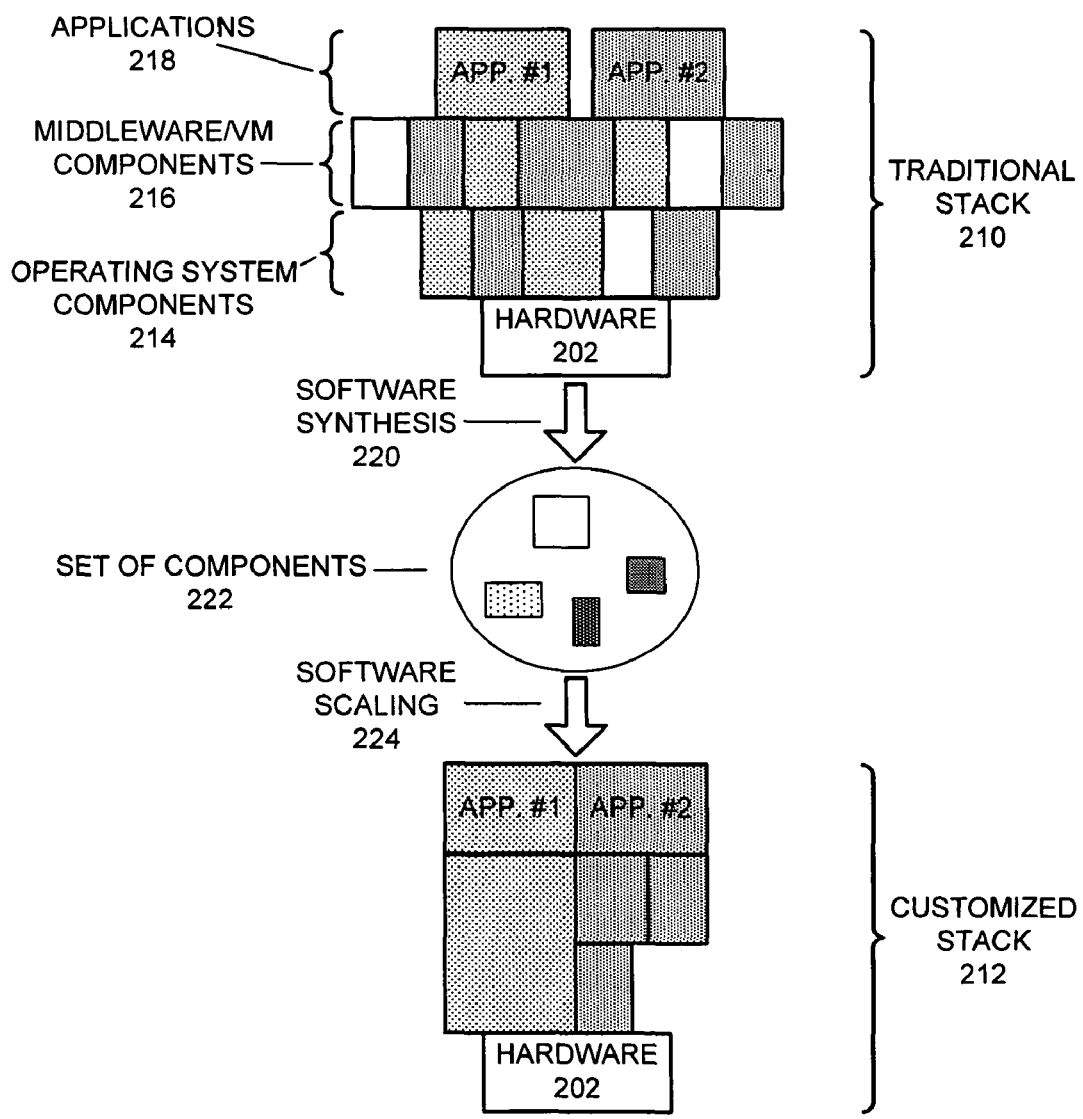
FIG. 2B illustrates the synthesis and scaling of a traditional software stack into a customized software stack in accordance with an embodiment of the present invention.

FIG. 2B illustrates the synthesis and scaling of a traditional software stack 210 into a customized software stack 212. The initial traditional stack 210 is unnecessarily rich, with a set of operating system components 214 and middleware/virtual machine (VM) components 216 that provide a wide range of services to applications 218. The system uses software synthesis 220 to identify a smaller set of components 222 required for the applications 218, and then software scaling 224 chooses the specific components suited to the composition of a minimal, resource-efficient infrastructure suited to the capabilities of the device hardware 202.

Virtual Machines for Sensor Applications

One embodiment of the present invention uses a high-level virtual machine (VM) as the core software for sensor nodes. This VM includes a common execution framework (such as data types and an instruction set), a computation model (e.g. concurrency and event handling), a set of runtime services for managing devices, application, and system resources, and a set of libraries for accessing device-specific capabilities. In a variation on this embodiment, the system uses the Java™ virtual machine (JVM) instruction set to specify the common execution framework for sensor nodes.

There are several benefits to using a VM as the core software. First, the VM masks the differences among sensor nodes through the common execution framework. Application distribution, management, and interoperability take place through the common intermediate representation. Secondly, the system can customize VM implementations to exploit specific capabilities of devices. These implementations can be scaled up or down, can be optimized for specific architectures, and/or can be made more resource aware without affecting applications. Finally, applications can access device-specific features (for instance, specific sensing or actuating capabilities) through a native library. Thus, applications can evolve as devices evolve, and interoperate with older devices at the same time. While VMs sometimes introduce overhead, the system can reduce such overhead through streamlined interpreter implementation and JIT compilation, as well as small-device-specific techniques such as partial compilation, result caching, and hardware-assisted instruction execution.

Device-Optimized Virtual Machines

Figure 3:
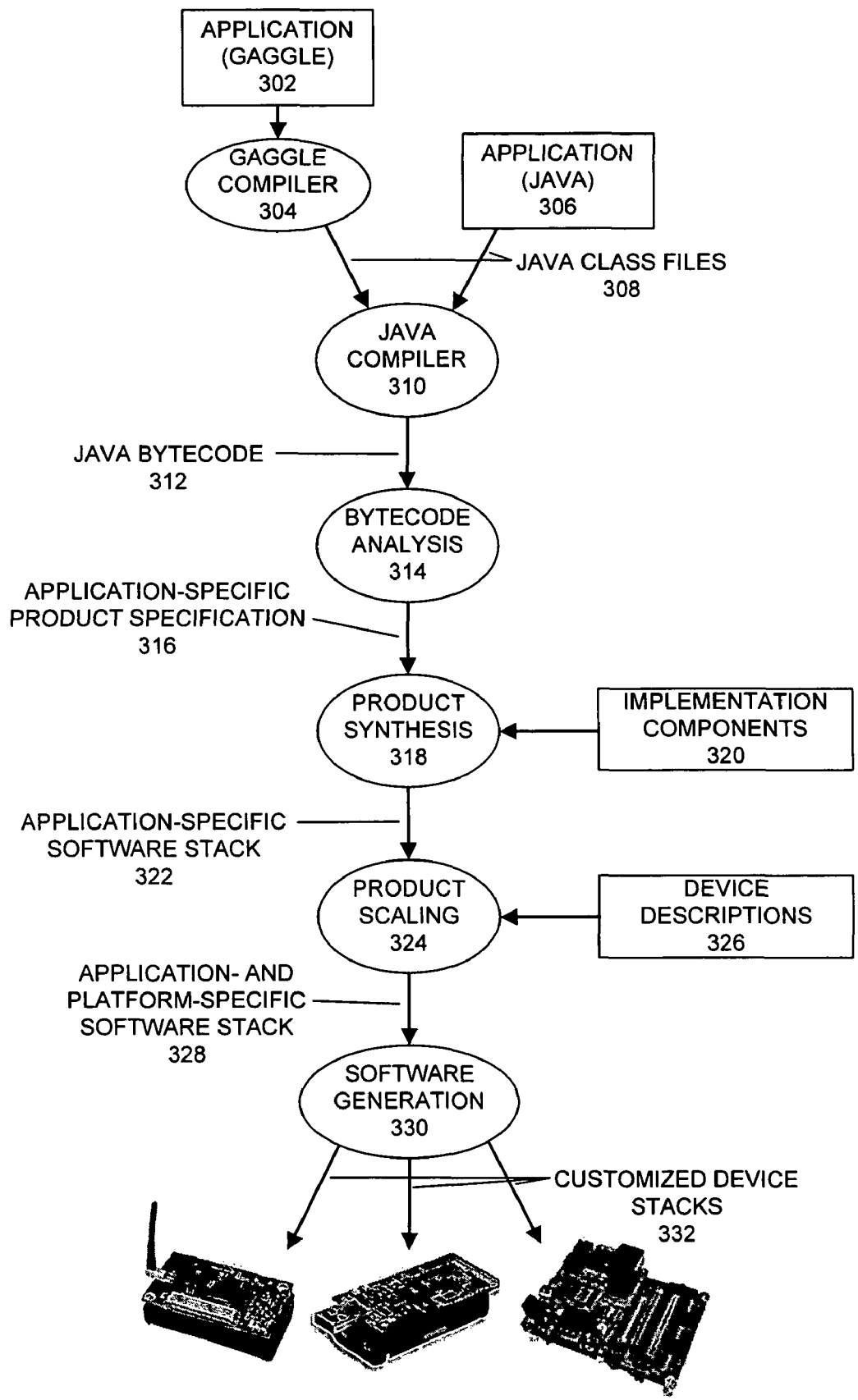
FIG. 3 illustrates the generation of a runtime environment for applications in accordance with an embodiment of the present invention.
Figure 4:
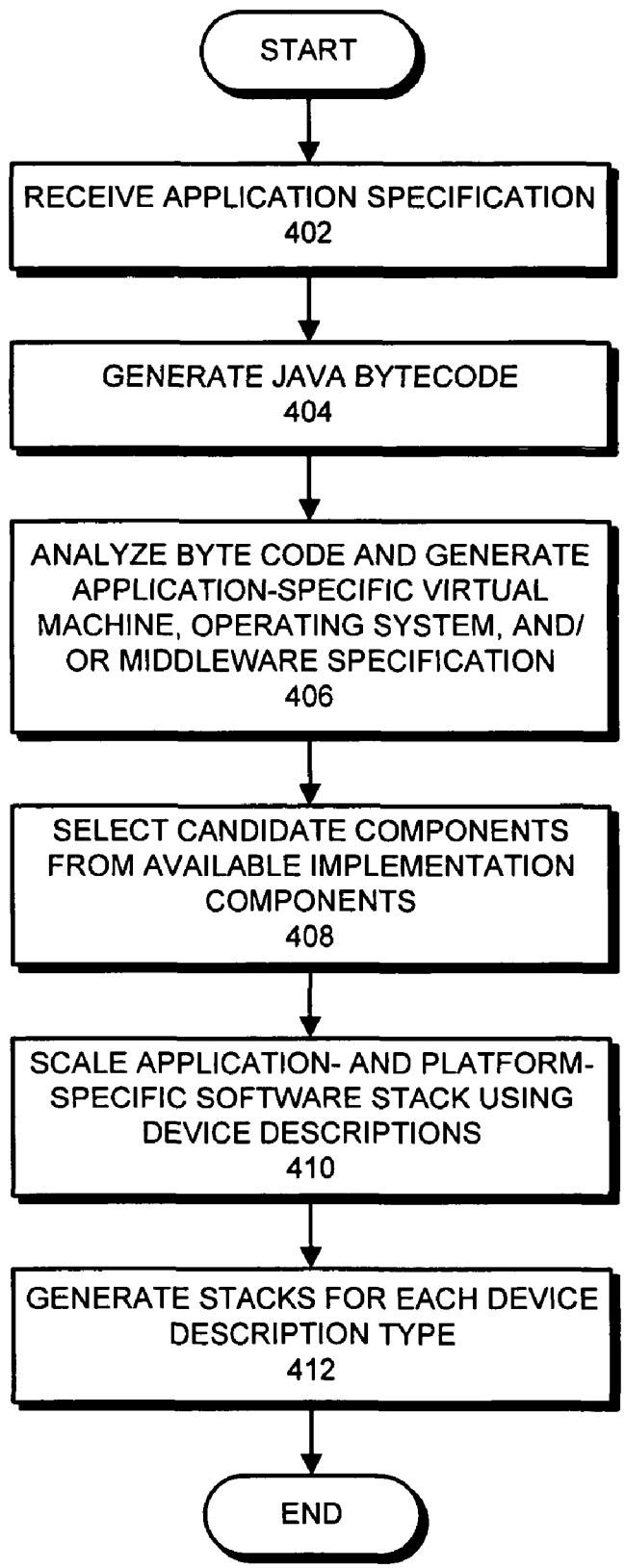
FIG. 4 presents a flow chart illustrating the generation of a runtime environment for applications in accordance with an embodiment of the present invention.

The system uses software synthesis and scaling to generate a device-specific and application-specific VM. FIG. 3 illustrates the generation of a runtime environment for applications, while FIG. 4 presents a flow chart illustrating application generation.

In the first step (step 402), the system receives an application specification. In one embodiment of the present invention, applications 302 are written in Gaggle, a macro-programming language designed for programming WSNs. Since sensor applications typically use such a large set of nodes that assigning individual tasks to nodes is difficult, Gaggle supports high-level abstractions for organizing and controlling sensor nodes in terms of groups, implementing and managing synchronous and asynchronous node and group-level interactions, and group-level information sharing. A Gaggle compiler 304 analyzes the application and transforms it into Java™ class files 308, thereby generating a product specification that characterizes the middleware components required to implement the application. Alternatively, the application 306 may be written in Java™ or other languages that can output Java™ class files or byte code. Note that the application specification is not language-dependent, and the techniques described in the present invention can be applied generally to any programming language.

Next, the system uses a Java™ compiler 310 to generate Java™ bytecode 312 (step 404). The bytecode program provides a high-level product requirement specification for the runtime environment that will run on each sensor device. This specification contains information about VM instructions, language abstractions (such as type, inheritance, static/instance variables, exception handling, concurrency, synchronization, etc.), references to other classes or native libraries, runtime, and operating system modules. The system performs byte code analysis 314 to generate a platform-independent product specification 316 that characterizes the VM and operating system (OS) components needed to run the application on a sensor node (step 406).

The high-level language-semantics-driven derivation of the application-specific product specification 316 allows the system to use a software synthesis tool to inspect a set of implementation components 320 and discard the components (e.g. instructions, runtime services, libraries, etc) not needed to run the application (step 408). The synthesis tool outputs an application-specific software stack 322 that describes a minimal set of application needs. For instance, if an application only requires 20 VM instructions to run, the produced stack will only contain support for those 20 instructions.

The system passes the application-specific software stack 322 on to a product scaling tool 324, which analyzes a set of target device descriptions 326, the application needs, and the candidate components to select a set of component implementations that meet the constraints imposed by the platform (step 410). The output of the product scaling 324 is an application- and platform-specific software stack 328. The system uses this stack for software generation 330, during which it generates customized device stacks 332 for each device description type (step 412). This involves creating a binary for each VM, and patching the application class for any references to native methods. After this, the system proceeds to use a distributed program loader to load the application and system software binary on the target device(s).

The high-level languages (e.g. Gaggle and Java™), the virtual machine that runs on each device, and the low-level operating system that interfaces with the low-level hardware form an abstract software stack. The fine-grained composition process described above allows the construction of application-specific virtual machines and operating systems that can be run on highly resource-constrained devices, while maintaining an illusion of a high-level programming language abstraction for WSN application writers.

Describing Components and Device Descriptions

One challenge in software synthesis and scaling lies in the ability to discover semantic properties of applications and the demands they place on the runtime environment. To scale a software infrastructure, the system needs to be able to identify the design parameters (e.g. memory, energy efficiency, performance, etc.), associate the design parameters with application and software infrastructure components, and use a design trade-off technique to select the set of components that will satisfy application requirements and node constraints. The system should be able to provide scaling services for a wide variety of object types, such as different thread types, software techniques (e.g. sorting or search methods, inheritance), code (e.g. code size scaling, type info, data structure types), data storage sizes and methods, and caching techniques/extent.

In one embodiment of the present invention, the system uses a component language that addresses these challenges by allowing software developers to annotate components with design-choice descriptions and associate complex dependency relationships among components. This language represents the software system at a very fine-grained level so that decisions about the composition of the system can be made at all levels, including specific data structures and functions. Given that a software stack on a sensor node will include components potentially written in several programming languages, this language also supports the ability to represent components described and implemented in different languages by separating the structure, composition, and scalability aspects of a system from its actual implementation. Finally, the language also facilitates future updates of applications and system software as WSN applications and infrastructure change, thereby allowing the system to implement changes in application requirements, to fix bugs, and to enhance capabilities of the system software.

Software Update

Another challenge in the WSN space involves long-term management of applications after deployment. Given that many sensing devices are embedded in physical settings that will be difficult to reach, the ability to dynamically update deployed applications and system software is important.

However, there are a number of challenges in providing updates to sensor network nodes. First, re-flashing sensor node binaries can be error-prone, and errors in updates can render a large number of devices unusable. Another concern is security, since anyone with access to the control channels can upgrade the firmware. Finally, for widely-deployed sensor networks, the update process may need to patch thousands or even millions of heterogeneous devices. In the present invention, the system structures the VM to evolve dynamically to meet changing requirements, and modifies components selectively and securely.

The system supports secure updates by implementing a protocol that admits update requests only from authenticated end-points. The system implements an extensible VM using a remote dynamic linking service that adds new VM and service components to a sensor node VM. When an application is changed, the system generates new bytecode and determines any corresponding component changes.

In one embodiment of the present invention, the system uses a monitoring system to track the devices and application versions installed, and to facilitate pushing out incremental semantic changes. The system uses higher-capability devices (e.g. the gateway node 104 or base station 108 in FIG. 1) for tracking and to assist in the update process for lower-capability nodes. These higher-capability devices can speed up the update by providing features such as higher compute power, memory space, and remote incremental linking functionality. For instance, the base station can maintain for every sensor node installed the layout of program and data memory, the VM and application code, version information, etc. These flexible update options allow the efficient upgrade of the software infrastructure installed in the sensor network in the face of evolving applications.

In summary, the present invention provides a set of component-based development techniques that automate the process of customizing applications and system software for a range of widely different platforms, thereby generating application-specific software infrastructure that meets the resource constraints of sensor network applications.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for building a software stack for a target device to support a software application, the method comprising:
   identifying programming language abstractions that are required to support the software application based on a semantic analysis of a specification of the software application;
   receiving a set of resource constraints for the target device, wherein the resource constraints comprise available memory size, power requirements, and bandwidth capability for the device;
   for each identified programming language abstraction, analyzing a plurality of available implementations of the identified programming language abstraction based on the set of received resource constraints for the target device, wherein each implementation characterizes the service provided by the abstraction at varying capacities of memory, power, and bandwidth requirements;
   selecting a set of implementations for the identified programming language abstractions based on the analyzing, wherein the selected set of implementations satisfy the received resource constraints for the target device;

building, by computer, the software stack based on the selected implementations of the identified programming language abstractions, wherein the software stack meets the received resource constraints for the target device; and loading the software stack and the software application on the target device.

2. The method of claim 1, wherein the software stack implements a virtual machine.

3. The method of claim 1, wherein the software stack implements a middleware.

4. The method of claim 1, wherein the software stack implements an operating system.

5. A non-transitory computer-readable storage medium storing instructions that when executed by a computer system cause the computer system to perform a method for building a software stack for a target device to support a software application, the method comprising:

identifying programming language abstractions that are required to support the software application based on a semantic analysis of a specification of the software application;

receiving a set of resource constraints for the target device, wherein the resource constraints comprise available memory size, power requirements, and bandwidth capability for the device;

for each identified programming language abstraction, analyzing a plurality of available implementations of the identified programming language abstraction based on the set of received resource constraints for the target device, wherein each implementation characterizes the service provided by the programming language abstraction at varying capacities of memory, power, and bandwidth requirements;

selecting a set of implementations for the identified programming language abstractions based on the analyzing, wherein the selected set of implementations satisfy the received resource constraints for the target device;

building the software stack based on the selected implementations of the identified programming language abstractions, wherein the software stack meets the received resource constraints for the target device; and loading the software stack and the software application on the target device.

6. The computer-readable storage medium of claim 5, wherein the software stack implements a virtual machine.

7. The computer-readable storage medium of claim 5, wherein the software stack implements a middleware.

8. The computer-readable storage medium of claim 5, wherein the software stack implements an operating system.

9. A apparatus for building a software stack for a target device to support a software application, the apparatus comprising:

a processor;

a memory;

an identifying mechanism configured to identify programming language abstractions that are required to support the software application based on a semantic analysis of a specification of the software application;

a receiving mechanism configured to receive a set of resource constraints for the target device, wherein the resource constraints comprise available memory size, power requirements, and bandwidth capability for the device;

an analyzing mechanism configured to analyze, for each identified programming language abstraction, a plurality of available implementations of the identified programming language abstraction based on the set of received resource constraints for the target device, wherein each implementation characterizes the service provided by the abstraction at varying capacities of memory, power, and bandwidth requirements;

a selection mechanism configured to select based on the analyzing, a set of implementations for the identified programming language abstractions, wherein the selected set of implementations satisfy the received resource constraints for the target device;

a building mechanism configured to build the software stack based on the selected implementations of the identified programming language abstractions, wherein the software stack meets the received resource constraints for the target device; and a loading mechanism configured to load the software stack and the software application on the target device.

10. The apparatus of claim 9, wherein the software stack implements a virtual machine.

11. The apparatus of claim 9, wherein the software stack implements a middleware.

12. The apparatus of claim 9, wherein the software stack implements an operating system.

* * * * *